United States Patent [19]

Mölders

[11] Patent Number: 4,559,673
[45] Date of Patent: Dec. 24, 1985

[54] METHOD AND APPARATUS FOR SEPARATING A NONWOVEN STUFFING MATERIAL

[75] Inventor: Claus Mölders, Friesenheim, Fed. Rep. of Germany

[73] Assignee: Badenia GmbH Stepeedeckenfabrik, Friesenheim 4, Fed. Rep. of Germany

[21] Appl. No.: 631,699

[22] Filed: Jul. 17, 1984

[51] Int. Cl.⁴ .................. D01G 11/00; D01G 15/04
[52] U.S. Cl. ........................................................ 19/82
[58] Field of Search ............................................ 19/82

[56] References Cited

U.S. PATENT DOCUMENTS

| | | | |
|---|---|---|---|
| 272,856 | 2/1883 | Coburn | 19/82 |
| 3,098,264 | 7/1963 | Meinicke | 19/82 |
| 3,364,526 | 1/1968 | Varady et al. | 19/82 |
| 4,484,377 | 11/1984 | Morel | 19/82 |

FOREIGN PATENT DOCUMENTS

| | | | |
|---|---|---|---|
| 1907827 | 11/1970 | Fed. Rep. of Germany | 19/82 |
| 2520290 | 11/1976 | Fed. Rep. of Germany | |
| 2703063 | 7/1978 | Fed. Rep. of Germany | |

*Primary Examiner*—Louis K. Rimrodt
*Attorney, Agent, or Firm*—Armstrong, Nikaido, Marmelstein & Kubovcik

[57] ABSTRACT

The invention relates to a method and apparatus for separating a nonwoven fleece-like filling or stuffing material from a fabric covering material in which no manual work is required. Three operations are provided. In the first operation the material is cut up, in the second broken down by tearing or fulling work and in the third operation separated by centrifuging. The apparatus consists of a punch (11), draw-in rollers (14, 15) and a carding machine (12) from which the material is transferred via brush rollers (20) to centrifuging rollers (13) for separating the nonwoven material from the covering material.

10 Claims, 2 Drawing Figures

METHOD AND APPARATUS FOR SEPARATING A NONWOVEN STUFFING MATERIAL

The invention relates to a method for separating a nonwoven stuffing material from a fabric covering material The invention also relates to an apparatus for carrying out this method.

In the manufacture of garments, quilts and the like a considerable amount of waste material accumulates in which the nonwoven fleece-like filling or stuffing material is already joined to the fabric covering material for example by close quilting seams. It is however also possible for the different materials to lie only loosely on each other. Since the nonwoven stuffing material is often very valuable it is unacceptable economically to throw it away as production waste. Hitherto, the different materials were separated by hand which for example in the case of firm quilting seams is very troublesome and time consuming. However, with other forms of joining as well hitherto the separation for recovering the nonwoven stuffing had to be done by hand. This work was largely given to persons to do at home. Because of increasing costs in this trade in particular this labour-intensive work led to the recovery of even highly valuable expensive stuffing materials such as sheep's wool becoming economically impracticable.

German Pat. No. 2,703,063 describes a method in which joined cellulose and plastic components after cutting are separated from each other by simple suction. By far the greater part of the recovery of cellulose is thus by simple suction after initial cutting. This is not the case in the subject of the invention.

In German Pat. No. 2,703,063 a rotor is provided whose purpose is to beat the materials to pieces. The separation of the materials is then again by suction. This beating is fundamentally equivalent to the ordinary cutting operation.

The known method operates discontinuously.

The problem underlying the invention is to provide a method and an apparatus for carrying out the method in which by means of various operations the various materials are mechanically treated in such a manner that the nonwoven fleece-like filling or stuffing material, separated from its covering material, is collected for re-use.

This problem is solved in the method according to the invention by the features set forth. The apparatus used in this method proceeds from German Pat. No. 1,907,827 and solves the problem set by the features set forth in the specific combination of operational elements described.

German Pat. No. 1,907,827 discloses an apparatus in which waste is comminuted by using various blades. The object of this citation is to avoid strip-shaped pieces of waste winding round the feed rolls. This citation is thus directed to the cutting up whereas in the apparatus according to the invention a tearing up is achieved through a carding arrangement. Such a carding arrangement is not described in the citation. It is pointed out that in processing yarn waste after the stamping and cutting operation a carding machine may follow. No indications at all are given of the form of such a carding arrangement.

In the method and apparatus according to the invention the nonwoven stuffing material and the fabric covering material are mechanically treated in three working operations and in the last of these operations separation of the nonwoven stuffing material from the covering material by means of centrifugal force takes place. The entire processing duration is considerably shorter than when separating the various materials by hand. Another advantage is that manual adjustments may be made to individual working steps to enable them to be easily adapted to the operating conditions.

The invention will be explained with the aid of the attached Figures, wherein.

Figure 1:
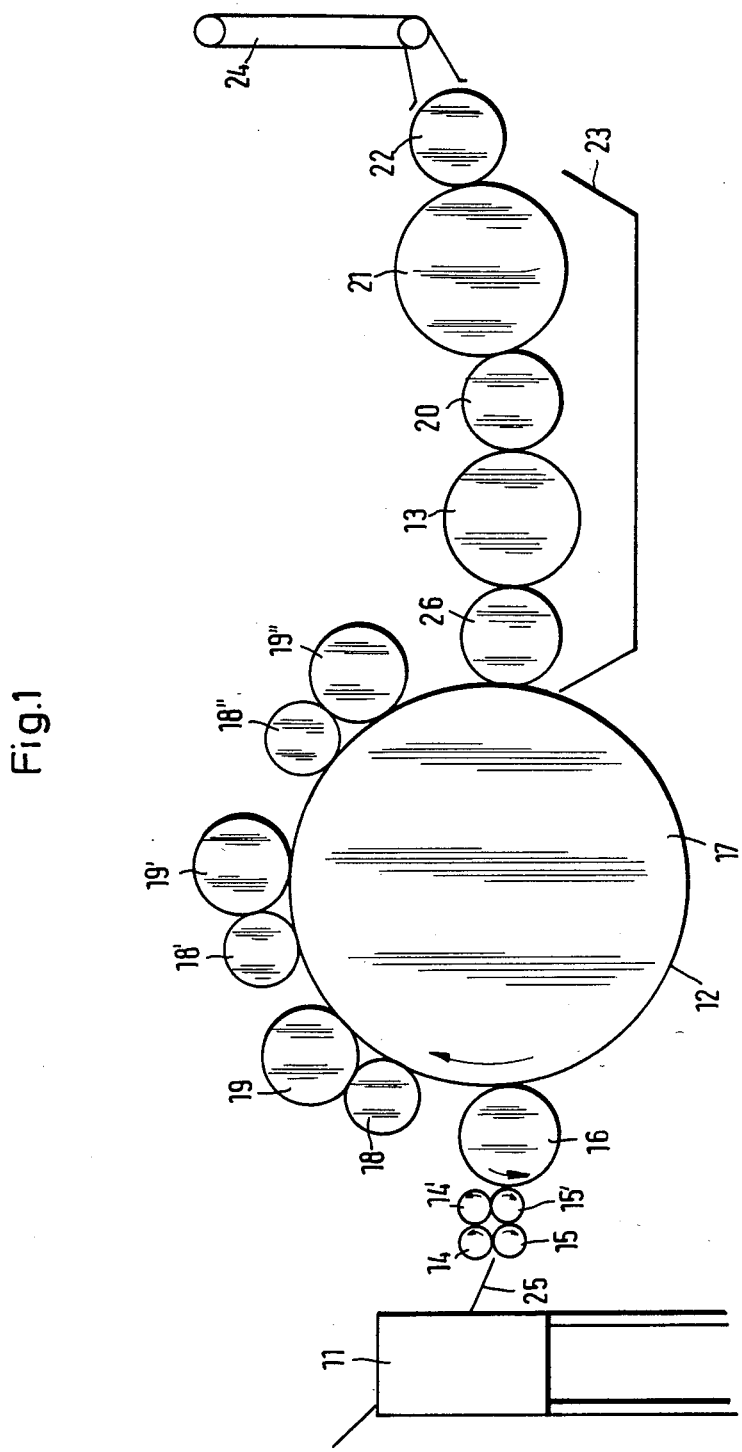
FIG. 1 is a cross-section through the apparatus.

In a first operation the stuffing material and the covering material are comminuted by a punch 11 serving as cutting means. The ideal size of the cut parts is 20×20 mm to 30×50 mm. In the example of embodiment the covering material is cotton tricot with a weight of 85-100 g and as stuffing new wool is used with an $m^2$ weight between 300 and 800 g. From the punch or cutter 11 the comminuted material is supplied to a second operation via a slide plate 25. This cut-up material is drawn between a roller pair 14, 15. However, as illustrated in the example of embodiment a second roller pair 14', 15' may be disposed in series therebehind. The speed of these roller pairs 14, 15 defines the hourly output of the apparatus. The spacing of the rollers 14, 15 apart must be such that the material is pressed and held. The spacing is usually between 0 and 10 mm. The surfaces of the rollers 14, 15 consist of sawtooth wire. In the example of embodiment the pitch is 8 flights per inch, the height 5.5 mm, the division 7.5 mm and the breast angle 30°.

The roller pairs 14, 15, 14', 15' pass the cut covering and stuffing material to a transfer roller 16 which passes the material to the carding machine 12 of the second operation. A second transfer roller 16 may also be provided. The transfer roller 16 serves to transfer the entire material to the cylinder 17 of the carding machine 12 and to equalize the material. The diameter of the transfer rolls 16 may be chosen as desired. In the example of embodiment the diameter is 213 mm with a peripheral speed of 15 m per minute. The peripheral speed itself is variable and is 20 to 40% of the peripheral speed of the cylinder 17. The surface of the transfer roller 16 consists of sawtooth wire which is commercially available as Morell wire and has a pitch of 10 flights per inch, a height of 4.7 mm, a division of 8.5 mm, a breast angle of 40° and 30 tips per square inch.

The material is now delivered by the transfer roller 16 to the cylinder 17, of which the diameter may be as desired. In the example of embodiment this diameter is 850 mm. The peripheral speed is variable and in the example of embodiment is 50 m per minute.

The surface of the cylinder 17 comprises sawtooth wire of the same nature as that of the transfer roller 16. Disposed around the cylinder 17 are roller pairs 18, 19, 18', 19', 18'', 19''. The number of roller pairs is however variable and depends on the nature of the material to be processed. Each roller pair consists of a clearer 18 and a worker 19. The roller pairs 18, 19, 18', 19', 18'', 19'' carry out together with the cylinder the separation of the covering material from the nonwoven stuffing material.

Figure 2:
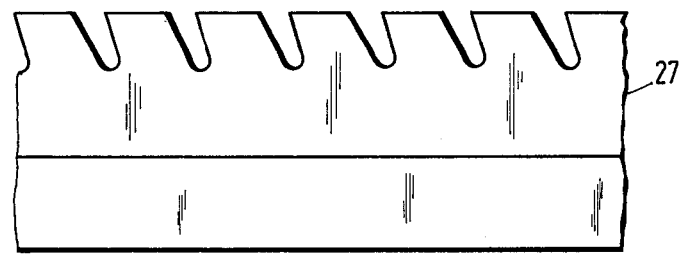
FIG. 2 is a partial side view of the Morell wire used.

In the classical carding operation an attempt is made by a combing effect to achieve an equalizing or straightening of the fibers. However, in the present method only a separation of the fabric from the filling is to be obtained. For this purpose the surface wire of the worker 19, 19', 19'' and of the cylinder 17 must be chosen as regards the tip form (Morell wire with flat tip (see FIG. 2)) and the density in such a manner that the stuffing is separated from the covering material by a milling or fulling operation.

The diameters of the workers 19, 19', 19" and clearers 18, 18', 18" may be chosen as desired but it should be ensured that the clearers 18, 18', 18" are always smaller than the workers 19, 19', 19". The peripheral speed of the roller pairs 18, 19, 18', 19', 18", 19" depends on the materials to be processed. These roller pairs perform together with the cylinder 17 the separation of the covering material from the nonwoven stuffing. The peripheral speed of the workers 19, 19', 19" and clearers 18, 18', 18" also depends on the materials to be processed. In the example of embodiment in the case of the workers 19, 19', 19" it is 7.5 m per minute and in the case of the clearers 18, 18', 18" 15 m per minute. However, the peripheral speed of the workers 19, 19', 19" should always be between 10 and 30% of the peripheral speed of the cylinder 17 but in the case of the clearers 18, 18', 18" should be 20 to 40%. The worker 19, 19', 19" in the example of embodiment is provided with sawtooth wire commercially available as Morell wire and having a pitch of 10 flights per inch, a height of 4.19 mm, a division of 5.08 mm, a breast angle of 40° and 50 tips per square inch. The clearers 18, 18', 18" have a surface of brushes. The density and hardness of these brushes again depends on the material to be processed. Also dependent on the material to be processed is the spacing apart of the rollers, the following conditions obtaining in the example of embodiment:

Cylinder 17/worker 19: 5 mm
Cylinder 17/worker 19': 4 mm
Cylinder 17/worker 19": 3 mm The spacing of the clearers 18, 18', 18" from their respective workers 19, 19', 19" depends on the density and hardness of the brushes.

After the processing of the material at the last roller pair 18",19" the material is removed by a brush roller 26 from the cylinder 17 and passed to a centrifuging roller 13. This centrifuging roller 13 permits final separation of the stuffing from the covering material. However, after the centrifuging roller 13 via an intermediate brushing roller 20 a further centrifuging roller 21 may be provided whose peripheral speed is greater than that of the centrifuging roller 13. Further centrifuging rollers with corresponding interposed brushing rollers may also be provided. It should be ensured that each further centrifuging roller has a greater peripheral speed than the preceding one. The brush rollers, 20, 26 themselves only transfer the material.

The centrifuging rollers 13, 21 are surrounded by sawtooth wire commercially available as Morell wire. Two different wires are attached in parallel. The first wire has in the example of embodiment a height of 3.8 mm, a division of 3.1 mm, a breast angle of 50°, a root thickness of 1 mm and a pitch of 25 flights per inch. The second wire has a height of 3.8 mm, a division of 5.5 mm, a breast angle of 50°, a root thickness of 1 mm and a pitch of 32 flights per inch. The wire of the centrifuging roller 21 has in contrast to the centrifuging roller 13 a root thickness of 0.8 mm. The wire used must be chosen so that the fibers remain adhering and the material is thrown off by centrifugal force. The distance of the brush rollers 20, 26 from the centrifuging rollers 13, 21 must be selected to ensure transfer of the material. In the example of embodiment this distance is −1 mm to +2 mm. With −1 mm ±0 mm the brushes enter the Morell wire.

Beneath the brush rollers 20, 26 and centrifuging rollers 13, 21 there is a collecting grating 23 into which the covering material drops. The stuffing material is transferred by the last centrifuging roller 21 to a removal brush roller 22 from which it is sucked off via a suction tube 24 for re-use.

I claim:

1. The method of separating a nonwoven stuffing material from a fabric covering material to which it is adhered comprising the steps of:
    (a) comminuting said adhered materials into small pieces by a cutting machine;
    (b) transferring said comminuted pieces from said cutting machine into a carding device adapted to mechanically detach said nonwoven stuffing material from said fabric covering material pieces;
    (c) passing said detached comminuted materials from said carding device to a centrifuging device wherein said nonwoven stuffing material is retained on brush rollers and said fabric covering material pieces are thrown off by centrifugal force; and
    (d) removing said nonwoven stuffing material from said brush rollers by suction means for reuse.

2. Apparatus for separating a nonwoven stuffing material from a fabric covering material comprising:
    comminuting means for cutting said materials into small pieces;
    carding means adapted to mechanically detach said nonwoven stuffing material from said fabric covering material pieces;
    centrifuging means arranged to centrifugally separate said detached nonwoven stuffing material from said fabric covering material pieces;
    means for feeding said comminuted pieces from said comminuting means to said carding means;
    means for passing said detached materials from said carding means to said centrifuging means; and
    means for removing said nonwoven stuffing material from said centrifuging means for reuse.

3. Apparatus as claimed in claim 2 wherein said comminuting means comprises a punch, said carding means comprising a cylinder and a plurality of worker and cleaner rollers and said centrifuging means includes at least one centrifuging roller and a brush roller for removal of said nonwoven stuffing material.

4. Apparatus as claimed in claim 3 wherein said means for feeding said comminuted pieces comprises a slide plate and at least one pair of rollers for transferring said comminuted pieces to said carding means.

5. Apparatus as claimed in claim 3 wherein a brush roller is provided for passing said separated materials from said carding means to said centrifuging means.

6. Apparatus as claimed in claim 3 wherein said centrifuging means includes a plurality of centrifuging rollers provided with transfer rollers disposed therebetween.

7. Apparatus as claimed in claim 3 further comprising a collecting grating disposed below said centrifuging means for receiving said separated covering material pieces.

8. Apparatus as claimed in claim 3 wherein said centrifuging means includes at least one roller surrounded with Morrel wire.

9. Apparatus as claimed in claims 3 wherein said means for removing said nonwoven stuffing material comprises a suction tube for sucking said nonwoven stuffing material from said brush roller.

10. Apparatus as claimed in claim 3 wherein the spacing between said cylinder and said worker rollers is in the range between 3 mm and 5 mm, whereby only a detaching of said nonwoven stuffing material from said fabric covering material occurs.

* * * * *